June 26, 1962  W. HOBBS, JR  3,040,873
BUCKET ELEVATOR
Filed Dec. 4, 1959  2 Sheets-Sheet 1

INVENTOR
WILLIAM HOBBS, JR.
By Walter V. Wright

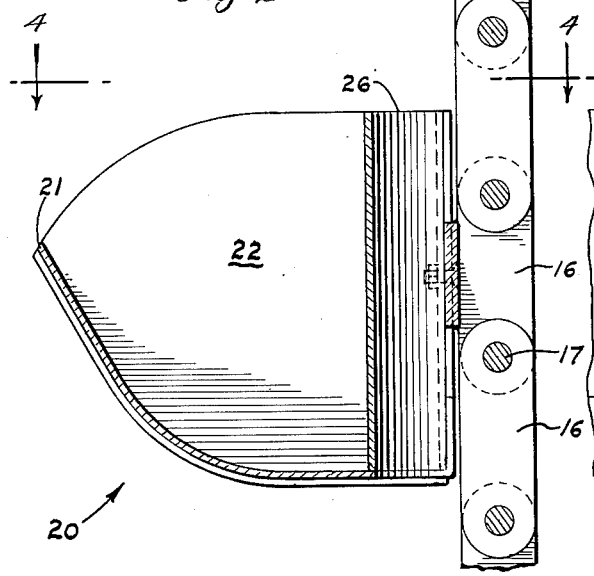
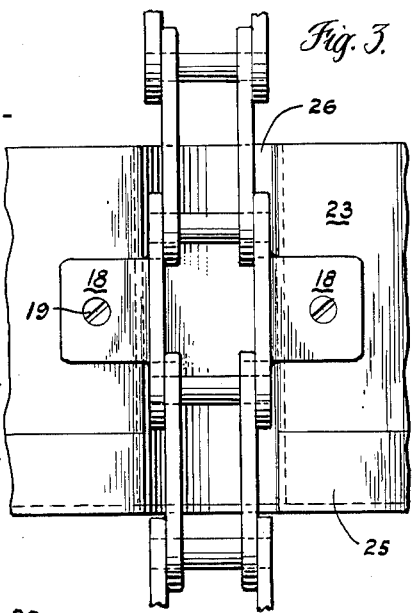
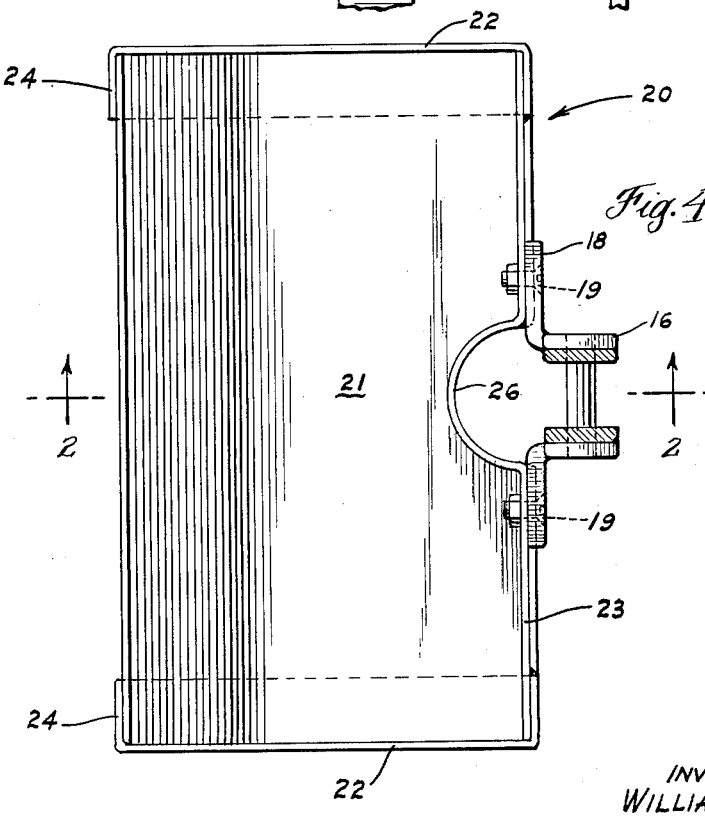
INVENTOR
WILLIAM HOBB, JR.
By Walter V. Wright

United States Patent Office 3,040,873
Patented June 26, 1962

3,040,873
BUCKET ELEVATOR
William Hobbs, Jr., Lancaster, Pa., assignor to Sperry Rand Corporation, New Holland, Pa., a corporation of Delaware
Filed Dec. 4, 1959, Ser. No. 857,366
2 Claims. (Cl. 198—152)

The invention relates to conveyors of the well-known bucket elevator type.

Bucket elevators are extensively employed where it is desired to convey fluent grain, such as shelled corn or wheat, from a given point to a point of higher elevation.

An important problem in grain handling equipment is the destruction of grain between moving parts of the machinery. Grain trapped between two moving machinery parts is readily crushed and, consequently, ruined. The crushing of one kernel of grain not only ruins that kernel, but also provides a starting point for rot and mold which may spread to surrounding good kernels. The percentage of damaged grain to good grain is one factor influencing the price that grain will bring on the market. As the ratio of damaged grain to good grain increases, the value of the lot decreases; therefore, damaged grain may reduce the value of good grain merely by its presence even though no direct deleterious result has yet occurred.

In a typical grain elevator, a number of buckets are mounted on an endless chain which is entrained over two or more spaced sprockets. Normally, one of the sprockets is located in a bin containing the grain to be conveyed. The sprocket, so located, is usually partially or completely submerged in grain. As the buckets travel in the curved path defined by this sprocket to pick up grain, their back walls lie in planes tangent to their curved path of travel. Grain in the bin is not only scoped into the bucket, but is also scooped into the space between the back wall of the bucket and the chain. As the path of travel of the bucket changes from curved to straight upon leaving the sprocket, the bucket back moves relative to the chain in a direction toward the chain. Since this relative movement occurs while the bucket is still submerged in grain, grain trapped between the bucket back and the chain may be crushed between these members.

Another source of grain damage in mechanism of this type is the continuous grinding effect between the sprocket teeth and the individual chain links as the teeth enter and leave the links in propelling the conveyor.

Grain may be handled by mechanical conveyors many times between the time it is harvested and the time it is utimately consumed. It is, therefore, important that grain damage be eliminated or reduced wherever possible in grain handling equipment.

A first primary object of this invention is to reduce grain damage between the bucket and the chain in bucket elevators.

Another primary object of this invention is to reduce grain damage between the sprocket teeth, the chain and the buckets in bucket elevators.

Another object of the invention is the provision of an improved elevator bucket designed to reduce grain damage while increasing the strength of the bucket.

A further object of this invention is the provision of a simple inexpensive bucket mount whereby greater clearance is provided between the bucket and chain without increasing the space between the chain and the plane of the back wall of the bucket.

A further object of this invention is the provision of an improved sprocket tooth design for bucket elevators.

A further object of this invention is to provide simple, efficient, inexpensive bucket elevators.

Other objects of the invention will be apparent hereinafter from the specification and from the recital in the appended claims.

In the drawings:

FIG. 2 is a vertical section taken on the line 2—2 of FIG. 4, showing a portion of the elevator chain and one of the elevator buckets mounted thereon;

FIG. 3 is a partial side elevation of the structure of FIG. 4; and,

FIG. 4 is a plan view of one of the elevator buckets of this invention.

Figure 1:
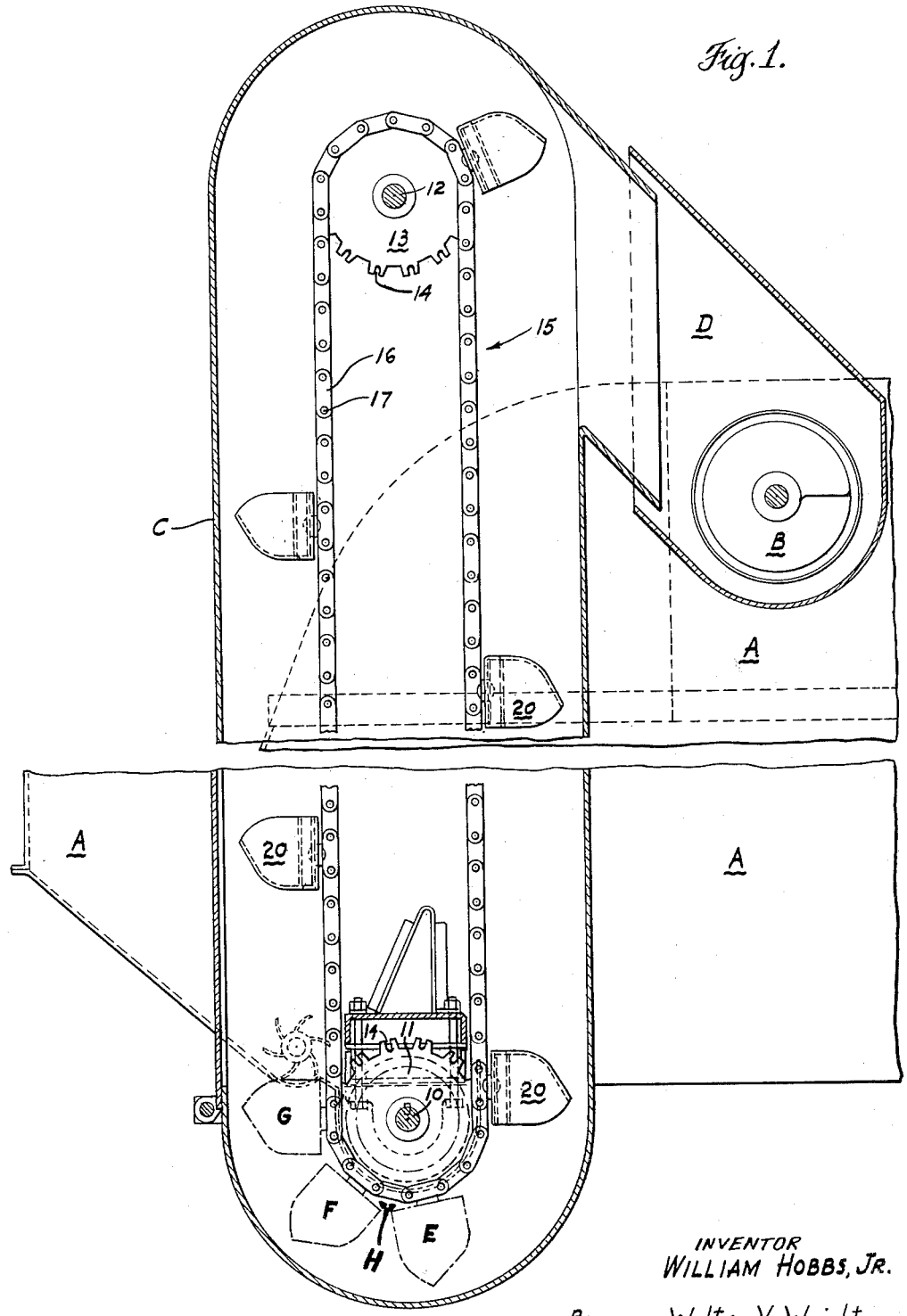
FIG. 1 shows portions of a grain drying bin carrying a bucket elevator constructed according to the principles of this invention. The front of the elevator housing has been broken away to reveal the elevator mechanism in front elevation.

Referring to FIG. 1 of the drawings, the letters A indicate portions of one end of a grain drying bin. The letter B indicates a horizontally disposed top auger on the bin. The letter C indicates an elongate vertically disposed bucket elevator housing carried by the end wall of the bin. The letter D indicates an inclined passage from the discharge point of the elevator buckets to the auger B. In operation of the drying bin, grain is initially introduced into the bottom of elevator housing C. The buckets, traveling in a clockwise direction around the lower sprocket, pick up the grain and deposit it in passage D. Auger B then conveys the grain over bin A and deposits it therein. There are augers (not shown) in the bottom of bin A which may be operated to feed grain back to the bottom of elevator housing C; thus, completing a closed circuit of travel for grain to be dried. While grain is conveyed around this circuit, heated air is forced through perforated side walls of the bin (not shown). During a single drying operation, any given kernel of grain may traverse this circuit many times, being exposed to possible damage by the conveying mechanism on each trip around the circuit.

A common area of grain damage, in conventional bucket elevators, is the area around the lower elevator sprocket. This sprocket may frequently be submerged in grain while the elevator is in operation. As a bucket progresses around the sprocket, as shown at E, F and G, grain flows into the wedge-shaped spaces H between the back of the buckets and the chain. This grain cannot escape through the chain because of the presence of sprocket teeth filling the openings in the links. As the bucket reaches position G and the back of the bucket again becomes parallel to the chain, grain may be crushed between the bucket back and the chain.

In conventional elevators, the combination of the sprocket teeth, the chain links and the bucket backs may also crush grain in the following manner: Each chain link (see FIG. 3, for example) defines four sides of a small box. The conventional bucket back provides a bottom for this box. As this makeshift box dips below the surface of the grain in the bottom of the elevator housing, it is filled with grain. The sprocket tooth enters the open side of the box when the chain link engages the sprocket. The small amount of grain thus confined within the four walls of a single link, the back of a bucket carried by that link and a sprocket tooth entering the only remaining open side of the link, is crushed between these meshing parts. The amount of grain damaged in this manner, though small, occurs each time a bucket passes around the lower sprocket. The number of buckets shown in FIG. 1 is merely for purposes of illustration. In actual practice there may be only one or two chain links separating two consecutive buckets. Consequently, an appreciable amount of grain is damaged in this manner.

Referring now to the disclosed embodiment of this invention, and particularly to FIG. 1, the numeral 10 indicates a shaft that may be driven by any conventional means (not shown). A toothed sprocket 11 is keyed to shaft 10 to be positively driven thereby. Disposed vertically above drive shaft 10 and parallel thereto is an idler shaft 12. Shaft 12 is supported by housing C. A sprocket 13 is rotatably mounted on shaft 12. The teeth of both sprockets 11 and 13 are formed with a notch 14 in the face of each tooth. These notches extend radially inwardly from the face of the teeth and pass completely through the teeth in directions parallel to the shafts 10 and 12. An endless chain 15 is entrained around sprockets 11 and 13 for travel in a circuitous path in a vertical plane. The direction of travel of chain 15, in FIG. 1, is clockwise around the sprockets. Chain 15 is made up of a plurality of parallel flat links 16 pivotally connected together by pins 17. Certain of the links 16, at spaced intervals along the chain, are provided with mounting brackets 18. As best seen in FIGS. 3 and 4, these brackets extend, one from each side of a link 16, in directions transverse to the path of travel of the chain. The brackets may be formed as an integral part of a special link having L-shaped side members in cross section; or they may be attached to a standard link by welding, for example. An aperture is provided in each bracket 18 to receive a bucket mounting bolt 19 (FIG. 4).

The elevator buckets are generally indicated by the numeral 20. Each bucket consists of a curved plate 21 forming the front and bottom thereof, two end plates 22 and a back wall 23. Flanges 24 (FIG. 4) and 25 (FIG. 3) are provided respectively, on end plates 22 and bottom plate 21 for purposes of assembling the bucket by spot welding.

As seen in FIGS. 2, 3 and 4, the back wall 23 of each bucket is bent inwardly to form a channel 26. This channel is spaced equally distant from each end wall 22 and extends from the top of back wall 23 to the bottom thereof. The width of channel 26 is slightly greater than the width of a chain link, as seen in FIGS. 3 and 4. The back wall 23 is provided with an aperture on each side of channel 26 through which mounting bolts 19 pass. In this way, the bucket is mounted on the chain with the chain suspended over channel 26 by mounting brackets 18. Clearance is, thereby, provided between the back wall of the bucket and the chain links without an undesirable increase in spacing between the chain and the plane of the bucket back wall. Channels 26 further serve as reinforcing ribs to increase the strength of the back walls of the buckets.

With this improved structure, grain that normally would be crushed between the chain links and the back wall of the bucket, is provided a means of escape through the channel 26. The sprocket teeth no longer enter a box defined by the chain and the back wall of the bucket. The notches 14 in the sprocket teeth reduce the facial area of the tooth which attempts to crush the grain and provide additional recesses into which grain may flow as it is contacted by the teeth.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. An elevator for conveying grain from a supply point to an elevated discharge point comprising, a first rotatable toothed sprocket at said supply point, the teeth of said sprocket each having a notch extending radially inwardly from the outer edge thereof, a second rotatable sprocket vertically spaced from said first sprocket, an endless chain composed of a plurality of pivotally connected links entrained around said sprockets with said notched teeth engaging said chain between consecutive pivotal connections, at least one bucket having a back wall provided with an elongate channel therein, means connecting said back wall at opposite sides of said channel to opposite sides of a single chain link with said connecting means and said link bridging said channel, all portions of said link and said connecting means being disposed outside of said channel, said channel extending parallel to the path of travel of said chain a distance greater than the length of said single link in the same direction, said channel having width in a direction transverse to the path of travel of said chain greater than the width of said single link in the same transverse direction, whereby when said bucket passes around said first sprocket to pick up grain at said supply point, grain between said sprocket teeth and said chain, said chain and said back wall and said teeth and said back wall may escape through said channel and notch and avoid being crushed by the relative movement of said sprocket, chain and back wall.

2. An elevator for conveying grain from a supply point to an elevated discharge point comprising a first rotatable toothed sprocket at said supply point, a second rotatable sprocket at said discharge point, each of the teeth of said sprockets having a notch therein extending radially inwardly from the face thereof, an endless chain composed of a plurality of pivotally connected links entrained around said sprockets with said notched teeth engaging said chain between consecutive pivotal connections, a bucket having a back wall provided with an elongate channel therein, said channel being greater in length and width than the length and width of a single link of said chain, a pair of mounting brackets carried by one of said links, one bracket extending laterally from each side of said one link, and means connecting said brackets to the back wall of said bucket on opposite sides of said channel with said link suspended centrally over said channel and outside thereof whereby when said bucket passes around said first sprocket to pick up grain at said supply point, grain between said sprocket teeth and said chain, said chain and said back wall and said teeth and said back wall may escape through said channel and notch and avoid being crushed by the relative movement of said sprocket, chain and back wall.

References Cited in the file of this patent

UNITED STATES PATENTS

| 566,230 | Schaefer et al. | Aug. 18, 1896 |
| 2,944,657 | Davis et al. | July 12, 1960 |

FOREIGN PATENTS

| 284,036 | Great Britain | Jan. 26, 1928 |